Figures 1, 2:
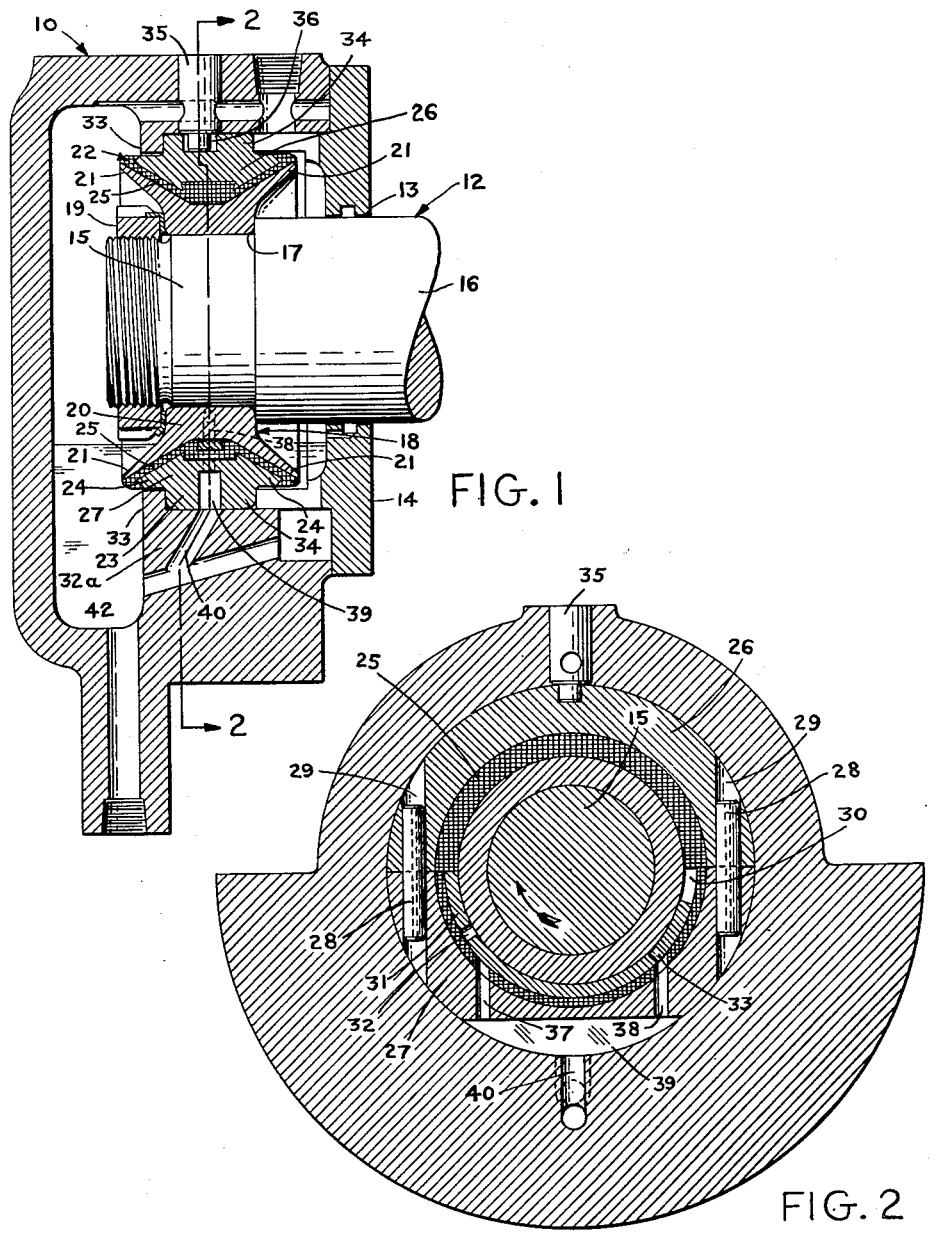

Aug. 27, 1957     W. C. KRUTZSCH, JR     2,804,357
ANGULAR CONTACT THRUST BEARING WITH LUBRICATING MEANS
Filed Dec. 15, 1954

WILLIAM C. KRUTZSCH, JR.
INVENTOR.

BY *Daniel A. Bohs*
        *atty.*

United States Patent Office 2,804,357
Patented Aug. 27, 1957

2,804,357

ANGULAR CONTACT THRUST BEARING WITH LUBRICATING MEANS

William C. Krutzsch, Jr., Roselle Park, N. J., assignor to Worthington Corporation, Harrison, N. J., a corporation of Delaware Application December 15, 1954, Serial No. 475,530

8 Claims. (Cl. 308—168)

The present invention relates to thrust bearings and more particularly to a sleeve-type thrust bearing.

In accordance with the present invention, a sleeve type bearing is provided having passage means for conducting lubricant from a reservoir to the bearing surface, and valve means disposed between the passage means and bearing surface for controlling the flow of lubricant to the bearing surface to provide a self-lubricating bearing for a shaft rotatable in either direction.

The present invention provides an angular contact sleeve thrust bearing to carry a greater load than a comparably sized ball bearing.

The present invention further provides an angular contact sleeve thrust bearing which carries the thrust load on a wedge-shaped oil film similar to the wedge-shaped oil film developed by the normal action of a journal bearing.

The invention will be better understood from the following description when considered in connection with the accompanying drawing forming a part thereof and in which:

Figure 1 is a vertical section of the thrust bearing of the present invention, and Figure 2 is a section taken on line 2—2 of Figure 1.

Like reference characters refer to similar parts throughout the views.

Referring to the drawings, the reference numeral 10 designates the housing of a thrust bearing unit in which is disposed the end of a shaft 12. Shaft 12 extends through a central opening 13 in wall 14 of the housing. End portion 15 of the shaft is partially threaded and is of smaller diameter than main shaft portion 16 to form a shoulder 17 thereon. A journal sleeve 18 is arranged on portion 15 and abuts shoulder 17. Sleeve 18 is fixedly attached to shaft portion 15 by a bearing nut 19 threaded on the end of shaft portion 15. Shaft 12 is rotated by means not shown and rotates sleeve 18 therewith.

Sleeve 18 comprises a substantially cylindrically-shaped middle portion 20 having conical or outwardly flared end portions 21. A sleeve-type bearing 22 is disposed on journal sleeve 18. Bearing 22 is substantially the same shape as sleeve 18 and comprises a cylindrically-shaped middle portion 23 having outwardly flared end portions 24. A babbitted wearing face 25 is provided on the inner periphery of the bearing. The bearing is split into upper and lower halves or portions 26 and 27 which are held together by roll pins 28 disposed in bores 29 drilled through the bearing portions in alignment with one another.

A recess 30 (Fig. 2) is provided in lower bearing portion 27. Recess 30 extends circumferentially of wearing face 25 adjacent middle portion 23 of the bearing. A valve comprising a curved plate 31 is slidably disposed in recess 30. Plate 31 is provided with spaced ports 32 and 33 (Fig. 2) extending therethrough. The plate extends a distance in the recess substantially less than the overall distance between the opposite ends of the recess to permit circumferential movement of the plate from one end of the recess to the opposite end thereof, as hereinafter described.

Bearing 22 is supported in the housing by an annular support 32a extending inwardly thereof. Support 32a is formed integral with the housing and is provided with a flange 33 on the inner periphery thereof. Flange 33 is disposed on the support on the side thereof opposite housing wall 14 and is adapted to engage a peripheral flange 34 disposed on bearing 22 adjacent the middle portion 23 thereof to prevent axial movement of bearing 22. A pin 35 extends through the upper portion of the housing and into slot 36 (Fig. 1) in flange 34 to prevent rotation of bearing 22 in the housing.

Spaced vertical passages 37 and 38 are provided in the lower bearing half 27 below recess 30. Passages 37 and 38 communicate with recess 30 at their upper end and at their lower end with passage inlet chamber 39. Chamber 39 is disposed in the lower part of the bearing portion 23 and extends downwardly through flange 34. Chamber 39 communicates with lubricant inlet lines 40 extending through support 32a and in communication with an oil storage reservoir or chamber 42 in the housing.

The upper ends of passages 37 and 38 are spaced axially of bearing half 27 in alignment with ports 32 and 33 of valve plate 31. The upper ends of the passages are spaced circumferentially of recess 30, so that passage 38 communicates with port 33 when shaft 12 is rotated in a clockwise direction and the left end of plate 31 abuts upper bearing half 26, as shown in Fig. 2, and with passage 37 in communication with port 32 when the shaft is rotated in a counter-clockwise direction and the right end of plate 31 abuts bearing half 26.

In operation, when shaft 12 is rotated the axial thrust or force of the shaft is transmitted through shoulder 17 and journal sleeve 18 fixedly attached thereto, to sleeve bearing 20. Bearing 20 opposes this axial thrust through an opposite reaction or force transmitted through housing support 32 and peripheral flange 33 to flange 34 disposed on the bearing, and thus prevents axial displacement of shaft 12 due to this axial thrust.

Simultaneously, with this operation of the bearing and shaft, when shaft 12 rotates in a clockwise direction, as indicated by the arrow in Fig. 2, frictional or adhesive forces cause valve plate 31 to move clockwise in recess 30 until the left end of the plate in Fig. 2 abuts the wearing face of the upper bearing half 26 adjacent the end of the recess. With the plate in this position, port 33 communicates with oil passage 38 which communicates with oil reservoir 42 to receive oil from the reservoir for discharge to the bearing.

This clockwise rotation of the shaft causes sleeve 18 to roll up toward the left side of the bearing 20 which results in a small clearance between the left side of bearing wearing face 25 and sleeve 18 in Fig. 2 and a relatively large clearance between the right side of bearing wearing face 25 and sleeve 18. Due to molecular attraction, a wedge-shaped oil film is drawn between the rubbing surfaces on the left side of bearing 20 and sleeve 18. Because of this difference in clearance between the bearing and sleeve, the pressure on the lubricating oil on the left side of the bearing is greater than the pressure on the right side thereof. Thus, lubricating oil is supplied to the bearing through passage 38 and port 33 in communication with the right or low pressure side of the bearing.

The rotation of shaft 12 causes the oil film to be carried circumferentially of the bearing to lubricate the entire surface of middle bearing portion 23 and the bearing end portions 24.

The conical shape of portions 24 provide an area of decreased pressure at the outer ends thereof for the oil film drawn therebetween due to greater centrifugal force and the oil film is discharged from bearing ends and passes back through the housing to oil reservoir 42.

When shaft 12 is rotated in a counter-clockwise direction, frictional or adhesive forces cause valve plate 31 to move counter-clockwise until the right end of the plate in Fig. 2 abuts the wearing face of bearing half 26 adjacent the right end of recess 30, and port 32 is in communication with oil passage 37 and reservoir 42 to receive oil from said reservoir. Sleeve 18 tends to roll up toward the right side of the bearing resulting in a small clearance between the right side of the bearing and sleeve in Fig. 2 and a relatively large clearance between the left side of the bearing and sleeve. Due to molecular attraction, a wedge-shaped oil film is then drawn between the rubbing surfaces on the right side of the bearing. Pressure on the lubricating oil is then greater on the right side of the bearing than on the left side thereof because of this difference in clearance between the bearing and sleeve. Thus, lubricating oil is supplied to the bearing through oil passage 37 and port 32 in communication with the left or low pressure side of the bearing.

Thus, the present invention provides a thrust bearing for a shaft rotatable in any direction having valve means for introducing lubricant to the low pressure side of the bearing.

It will be understood that the invention is not to be limited to the specific construction or arrangement of parts shown, but that they may be widely modified within the invention defined by the claims.

What is claimed is:

1. A bearing unit comprising a rotatable shaft, a journal sleeve fixed to said shaft for rotation therewith, a non-rotatable bearing having an inner wearing face disposed on said sleeve, said bearing wearing face having a circumferential recess therein, a plate circumferentially slidable in said recess and having a port therein, a casing enclosing said sleeve and bearing and supporting said bearing, said casing having a chamber therein for storing lubricant, and passage means in communication with said chamber and port for passing lubricant from the chamber to the bearing wearing face.

2. A bearing unit comprising a rotatable shaft, a journal sleeve fixed to said shaft for rotation therewith, a non-rotatable bearing having an inner wearing face disposed on said sleeve, said bearing wearing face having a recess extending circumferentially thereof, a plate having spaced ports slidably disposed in said circumferential recess, said plate extending a distance substantially less than the distance between the opposite ends of said recess, a casing enclosing said sleeve and bearing and supporting said bearing, said casing having a chamber therein for storing lubricant, and passage means in communication with said chamber and one of said ports when said shaft is rotated in one direction, and in communication with said chamber and another of said ports when said shaft is rotated in the opposite direction for passing lubricant from said chamber to said wearing face.

3. A bearing unit comprising a rotatable shaft, a journal sleeve fixed to said shaft for rotation therewith, a split bearing having an inner wearing face disposed on said sleeve, said bearing wearing face having a circumferential recess in the lower portion thereof, a curved plate having spaced ports slidably disposed in said circumferential recess, said plate extending a distance substantially less than the distance between the opposite ends of said recess to permit circumferential movement of said plate when the shaft is rotated, a casing enclosing said sleeve and bearing and supporting said bearing, said casing having a chamber therein for storing lubricant, and passage means in communication with said chamber and one of said ports when said shaft is rotated in one direction, and in communication with said chamber and another of said ports when said shaft is rotated in the opposite direction for passing lubricant from said chamber to said wearing face.

4. A thrust bearing unit comprising a rotatable shaft, a journal sleeve having outwardly flared end portions and fixed to said shaft for rotation therewith, a non-rotatable bearing having outwardly flared end portions and an inner wearing face disposed on said sleeve, said wearing face having a recess extending circumferentially thereof, a plate having spaced ports slidably disposed in said circumferential recess, said plate extending in said recess a distance substantially less than the distance between the opposite ends of said recess, a casing enclosing said sleeve and bearing and supporting said bearing, said casing having a chamber therein for storing lubricant, passage means in communication with said chamber and one of said ports when said shaft is rotated in one direction, and in communication with said chamber and another of said ports when said shaft is rotated in the opposite direction for passing lubricant from said chamber to said wearing face.

5. A thrust bearing unit comprising a rotatable shaft, a journal sleeve having outwardly flared end portions fixed to said shaft for rotation therewith, a non-rotatable bearing having outwardly flared end portions and an inner wearing face disposed on said sleeve, said wearing face having a recess extending circumferentially thereof, a plate having spaced ports slidably disposed in said circumferential recess, said plate extending in said recess a distance substantially less than the distance between the opposite ends of said recess, a fluid tight casing enclosing said sleeve and bearing, support means disposed in said casing for supporting said sleeve and bearing, said casing having a chamber therein for storing lubricant, said bearing having spaced passageways extending therethrough in communication with said chamber, said passageways being disposed in said bearing to communicate with one of said ports when said shaft is rotated in one direction, and to communicate with another of said ports when said shaft is rotated in the opposite direction for passing lubricant from said chamber to said wearing face.

6. A self-lubricating bearing comprising a bearing member having an inner wearing face with a circumferential recess therein, a valve plate having spaced ports therein disposed in said recess for slidable movement therein, and passage means extending through said bearing member in communication with said recess for passing lubricant therethrough to said recess to lubricate said bearing wearing face.

7. The self-lubricating bearing of claim 6 wherein said bearing member is provided with outwardly flared end portions and said passage means comprises spaced passageways.

8. The self-lubricating bearing of claim 6 wherein said valve plate extends in said recess a distance substantially less than the distance between the opposite ends of said recess, and said ports are disposed in said plate so that one of said ports communicates with said passage means when said plate is moved adjacent one end of said recess, and another of said ports communicates with said passage means when said plate is moved adjacent the opposite end of said recess.

References Cited in the file of this patent

UNITED STATES PATENTS

| 145,467 | Whitaker | Dec. 9, 1873 |
|---|---|---|
| 824,187 | Lowe | June 26, 1906 |
| 1,175,872 | Nees | Mar. 14, 1916 |
| 2,486,227 | Tydeman | Oct. 25, 1949 |

FOREIGN PATENTS

| 553,068 | France | Feb. 3, 1923 |
|---|---|---|
| 575,979 | Great Britain | Mar. 13, 1946 |